US012804689B2

(12) United States Patent
Madadi et al.

(10) Patent No.: US 12,804,689 B2
(45) Date of Patent: Nov. 17, 2026

(54) METHOD AND APPARATUS FOR SUPPORT OF MACHINE LEARNING OR ARTIFICIAL INTELLIGENCE TECHNIQUES FOR CSI FEEDBACK IN FDD MIMO SYSTEMS

(71) Applicant: Samsung Electronics Co., Ltd., Suwon-si (KR)

(72) Inventors: Pranav Madadi, Sunnyvale, CA (US); Jeongho Jeon, San Jose, CA (US); Joonyoung Cho, Portland, OR (US); Qiaoyang Ye, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 672 days.

(21) Appl. No.: 17/658,977

(22) Filed: Apr. 12, 2022

(65) Prior Publication Data

US 2022/0338189 A1 Oct. 20, 2022

Related U.S. Application Data

(60) Provisional application No. 63/175,894, filed on Apr. 16, 2021.

(51) Int. Cl.
*H04W 72/51* (2023.01)
*H04W 72/0446* (2023.01)
(Continued)

(52) U.S. Cl.
CPC ....... *H04W 72/51* (2023.01); *H04W 72/0446* (2013.01); *H04W 72/542* (2023.01); *H04W 80/02* (2013.01)

(58) Field of Classification Search
CPC ............. H04W 72/51; H04W 72/0446; H04W 72/542; H04W 80/02; H04W 8/24;
(Continued)

(56) References Cited

U.S. PATENT DOCUMENTS

| | | | | |
|---|---|---|---|---|
| 11,736,169 | B2 | 8/2023 | Cha | |
| 11,963,015 | B2 | 4/2024 | Kim | |
| 2019/0356516 | A1* | 11/2019 | Cao | H04L 25/0204 |
| 2019/0394758 | A1* | 12/2019 | Cheng | H04W 24/08 |

(Continued)

FOREIGN PATENT DOCUMENTS

| | | | | |
|---|---|---|---|---|
| WO | 2020022748 | A1 | 1/2020 | |
| WO | 2020067669 | A1 | 4/2020 | |
| WO | 2020/213964 | A1 | 10/2020 | |
| WO | 2021/064275 | A1 | 4/2021 | |
| WO | WO-2021242393 | A1 * | 12/2021 | H04L 1/1861 |

OTHER PUBLICATIONS

"5G; NR; Radio Resource Control (RRC); Protocol specification (3GPP TS 38.331 version 16.3.1 Release 16)", ETSI TS 138 331 V16.3.1, Jan. 2021, 916 pages.

(Continued)

*Primary Examiner* — Jay L Vogel
*Assistant Examiner* — Adam Joel Cerlanek

(57) ABSTRACT

Machine learning (ML) assisted channel state information (CSI) reporting or ML assisted CSI prediction includes receiving CSI reporting configurations that include indications that enable or disable at least one of: ML-assisted CSI prediction and artificial intelligence channel feature information (AI-CFI) reporting. ML model training is performed or trained ML model parameters are received, and CSI reference signals corresponding to at least one of the CSI reporting configurations are received. If ML-assisted CSI prediction is enabled, the CSI reporting configurations further include: a timing offset for future CSI prediction, and ML configurations including indication of an ML model used for the ML-assisted CSI prediction. If AI-CFI reporting is enabled, the CSI reporting configurations further include: a configuration for a report of the AI-CFI, and ML configurations including indication of an ML model used for the ML assisted-CSI feedback determination.

20 Claims, 13 Drawing Sheets

(51) Int. Cl.
*H04W 72/542* (2023.01)
*H04W 80/02* (2009.01)

(58) Field of Classification Search
CPC .... H04W 72/21; H04W 72/232; H04B 7/065; H04B 17/24; H04B 17/3913; H04B 7/0626; H04B 7/0413; H04B 7/0658; H04B 17/373; H04L 1/0026; G06N 20/00
See application file for complete search history.

(56) References Cited

U.S. PATENT DOCUMENTS

| | | | | |
|---|---|---|---|---|
| 2021/0068129 | A1* | 3/2021 | Ryu | H04W 80/02 |
| 2021/0076267 | A1 | 3/2021 | Cirkic et al. | |
| 2021/0091838 | A1* | 3/2021 | Bai | H04B 7/0639 |
| 2021/0351885 | A1* | 11/2021 | Chavva | G06N 3/04 |
| 2022/0131588 | A1* | 4/2022 | Elshafie | H04B 7/0626 |

OTHER PUBLICATIONS

"5G; NR; Physical layer procedures for data (3GPP TS 38.214 version 16.4.0 Release 16)", ETSI TS 138 214 V16.4.0, Jan. 2021, 173 pages.
"5G; NR; Medium Access Control (MAC) protocol specification (3GPP TS 38.321 version 16.3.0 Release 16)", ETSI TS 138 321 V16.3.0, Jan. 2021, 158 pages.
International Search Report and Written Opinion issued Jul. 22, 2022 regarding International Application No. PCT/KR2022/005462, 6 pages.
Extended European Search Report issued Jul. 23, 2024 regarding Application No. 22788497.0, 8 pages.
Office Action issued Jun. 1, 2026, in connection with European Patent Application No. 22788497.0, 9 pages.
Examination report issued Sep. 15, 2026, in connection with Indian Patent Application No. 202337063036, 9 pages.

* cited by examiner

```
CSI-ReportConfig ::=                    SEQUENCE {
    reportConfigId                          CSI-ReportConfigId,
    carrier                                 ServCellIndex                   OPTIONAL,   -- Need S
    resourcesForChannelMeasurement          CSI-ResourceConfigId,
    csi-IM-ResourcesForInterference         CSI-ResourceConfigId            OPTIONAL,   -- Need R
    nzp-CSI-RS-ResourcesForInterference     CSI-ResourceConfigId            OPTIONAL,   -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                SEQUENCE (SIZE (1.. maxNrofUL-Allocations)) OF INTEGER(0..32),
            p0alpha                                 P0-PUSCH-AlphaSetId
        },
        aperiodic                               SEQUENCE {
            reportSlotOffsetList                SEQUENCE (SIZE (1..maxNrofUL-Allocations)) OF INTEGER(0..32)
        }
    },
    reportQuantity                          CHOICE {
        none                                    NULL,
        cri-RI-PMI-CQI                          NULL,
        cri-RI-i1                               NULL,
        AI-CFI                                      NULL,
        cri-RI-i1-CQI                           SEQUENCE {
            pdsch-BundleSizeForCSI                  ENUMERATED {n2, n4}                                 OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL
    },
    AiCficonfig                             INTEGER (1..N)
```

FIG. 9

***CSI-AperiodicTriggerStateList* information element**

```
-- ASN1START
-- TAG-CSI-APERIODICTRIGGERSTATELIST-START

CSI-AperiodicTriggerStateList ::=   SEQUENCE (SIZE (1..maxNrOfCSI-AperiodicTriggers)) OF CSI-AperiodicTriggerState

CSI-AperiodicTriggerState ::=       SEQUENCE {
    associatedReportConfigInfoList      SEQUENCE (SIZE(1..maxNrofReportConfigPerAperiodicTrigger)) OF CSI-AssociatedReportConfigInfo,
    ...
}

CSI-AssociatedReportConfigInfo ::=  SEQUENCE {
    reportConfigId                      CSI-ReportConfigId,
    resourcesForChannel                 CHOICE {
        nzp-CSI-RS                          SEQUENCE {
            resourceSet                         INTEGER (1..maxNrofNZP-CSI-RS-ResourceSetsPerConfig),
            qcl-info                            SEQUENCE (SIZE(1..maxNrofAP-CSI-RS-ResourcesPerSet)) OF TCI-StateId
                                                                                    OPTIONAL -- Cond Aperiodic
        },
        csi-SSB-ResourceSet                 INTEGER (1..maxNrofCSI-SSB-ResourceSetsPerConfig)
    },
    csi-IM-ResourcesForInterference     INTEGER(1..maxNrofCSI-IM-ResourceSetsPerConfig)         OPTIONAL, -- Cond CSI-IM-ForInterference
    nzp-CSI-RS-ResourcesForInterference INTEGER (1..maxNrofNZP-CSI-RS-ResourceSetsPerConfig)    OPTIONAL, -- Cond NZP-CSI-RS-ForInterference
    ...
}

-- TAG-CSI-APERIODICTRIGGERSTATELIST-STOP
-- ASN1STOP
```

FIG. 10

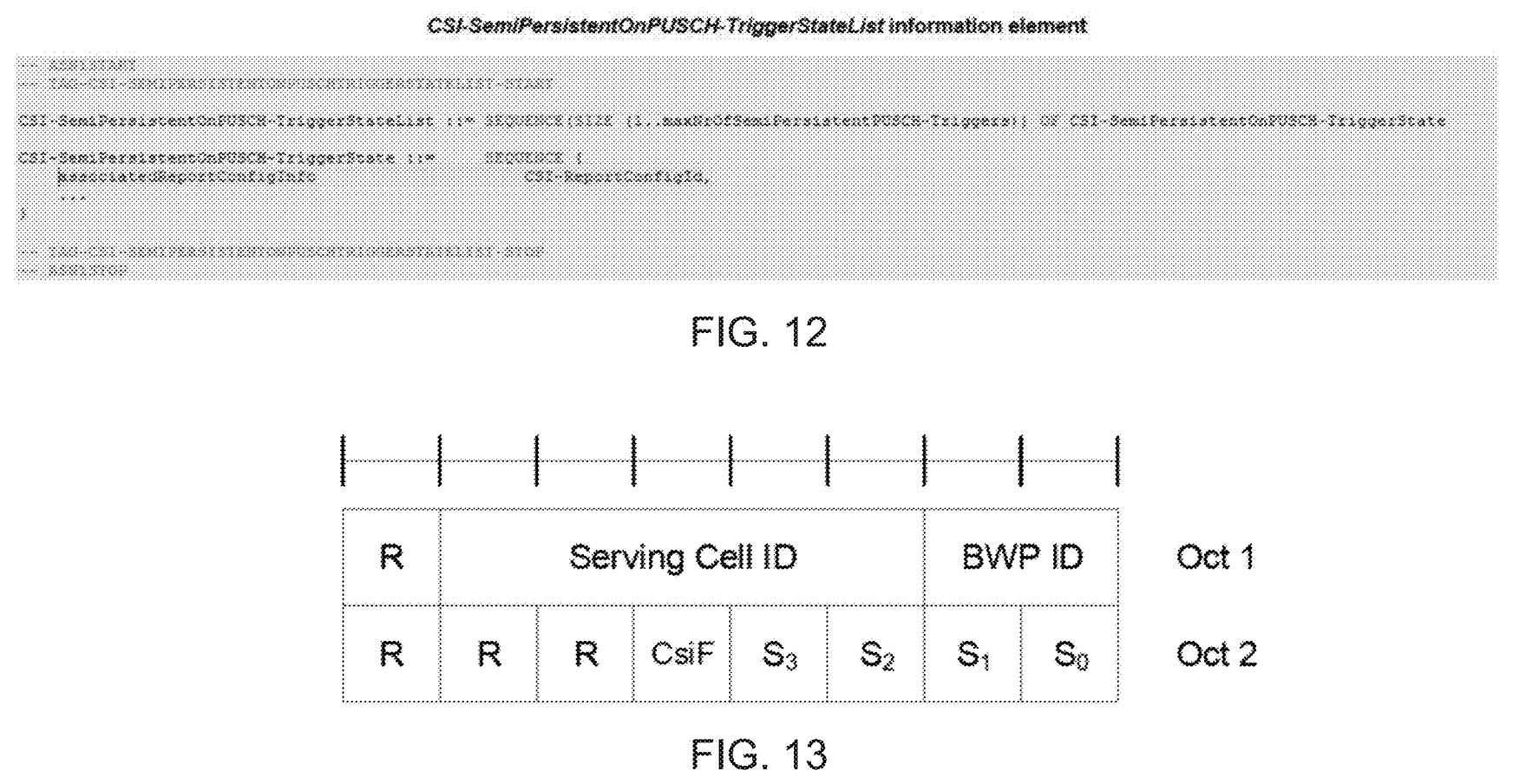

*CSI-SemiPersistentOnPUSCH-TriggerStateList* information element

```
-- ASN1START
-- TAG-CSI-SEMIPERSISTENTONPUSCHTRIGGERSTATELIST-START

CSI-SemiPersistentOnPUSCH-TriggerStateList ::= SEQUENCE(SIZE (1..maxNrOfSemiPersistentPUSCH-Triggers)) OF CSI-SemiPersistentOnPUSCH-TriggerState

CSI-SemiPersistentOnPUSCH-TriggerState ::=      SEQUENCE {
    associatedReportConfigInfo                  CSI-ReportConfigId,
    ...
}

-- TAG-CSI-SEMIPERSISTENTONPUSCHTRIGGERSTATELIST-STOP
-- ASN1STOP
```

FIG. 12

| | | | | | | | | |
|---|---|---|---|---|---|---|---|---|
| R | Serving Cell ID | | | | | BWP ID | | Oct 1 |
| R | R | R | CsiF | $S_3$ | $S_2$ | $S_1$ | $S_0$ | Oct 2 |

FIG. 13

```
CSI-ReportConfig ::=                SEQUENCE {
    reportConfigId                          CSI-ReportConfigId,
    carrier                                 ServCellIndex               OPTIONAL,   -- Need S
    resourcesForChannelMeasurement          CSI-ResourceConfigId,
    csi-IM-ResourcesForInterference         CSI-ResourceConfigId        OPTIONAL,   -- Need R
    nzp-CSI-RS-ResourcesForInterference     CSI-ResourceConfigId        OPTIONAL,   -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                SEQUENCE (SIZE (1.. maxNrofUL-Allocations)) OF INTEGER(0..32),
            p0alpha                                 P0-PUSCH-AlphaSetId
        },
        aperiodic                               SEQUENCE {
            reportSlotOffsetList                SEQUENCE (SIZE (1..maxNrofUL-Allocations)) OF INTEGER(0..32)
        }
    },
    reportQuantity                          CHOICE {
        none                                    NULL,
        cri-RI-PMI-CQI                          NULL,
        cri-RI-i1                               NULL,
        AI-CFI                                      NULL,
        cri-RI-i1-CQI                           SEQUENCE {
            pdsch-BundleSizeForCSI                  ENUMERATED {n2, n4}                             OPTIONAL    -- Need S
        },
        cri-RI-CQI                              NULL,
        cri-RSRP                                NULL,
        ssb-Index-RSRP                          NULL,
        cri-RI-LI-PMI-CQI                       NULL
    },
    AiCficonfig                             INTEGER (1..M)
    CfPred-timeoffset                       INTEGER
```

FIG. 15

METHOD AND APPARATUS FOR SUPPORT OF MACHINE LEARNING OR ARTIFICIAL INTELLIGENCE TECHNIQUES FOR CSI FEEDBACK IN FDD MIMO SYSTEMS

CROSS-REFERENCE TO RELATED APPLICATION AND CLAIM OF PRIORITY

This application claims priority to U.S. Provisional Patent Application No. 63/175,894 filed Apr. 16, 2021. The content of the above-identified patent document(s) is incorporated herein by reference.

TECHNICAL FIELD

The present disclosure relates generally to application of machine learning in communications equipment, and more specifically to improved channel state information feedback.

BACKGROUND

To meet the demand for wireless data traffic having increased since deployment of 4$^{th}$ Generation (4G) or Long Term Evolution (LTE) communication systems and to enable various vertical applications, efforts have been made to develop and deploy an improved 5$^{th}$ Generation (5G) and/or New Radio (NR) or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 giga-Hertz (GHz) or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and technologies associated therewith is for reference as certain embodiments of the present disclosure may be implemented in 5G systems, 6$^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Machine learning (ML) assisted channel state information (CSI) reporting or ML assisted CSI prediction includes receiving CSI reporting configurations that include indications that enable or disable at least one of: ML-assisted CSI prediction and artificial intelligence channel feature information (AI-CFI) reporting. ML model training is performed or trained ML model parameters are received, and CSI reference signals corresponding to at least one of the CSI reporting configurations are received. If ML-assisted CSI prediction is enabled, the CSI reporting configurations further include: a timing offset for future CSI prediction, and ML configurations including indication of an ML model used for the ML-assisted CSI prediction. If AI-CFI reporting is enabled, the CSI reporting configurations further include: a configuration for a report of the AI-CFI, and ML configurations including indication of an ML model used for the ML assisted-CSI feedback determination.

In one embodiment, a method includes indicating capability of a user equipment (UE) to support one of machine learning (ML) assisted channel state information (CSI) reporting or ML assisted CSI prediction. The method includes receiving configurations, wherein the configurations include one or more indications that enable or disable at least one of: ML-assisted CSI prediction and ML-assisted CSI reporting. The method further includes one of performing ML model training or receiving trained ML model parameters, and receiving CSI reference signals corresponding to at least one of the configurations, wherein if ML-assisted CSI prediction is enabled, the configurations further include: a timing offset for future CSI prediction, and ML configurations including indication of an ML model used for the ML-assisted CSI prediction. The method further comprises determining and transmitting predicted CSI as feedback, wherein if ML-assisted CSI reporting is enabled, the configurations further include: a configuration for a CSI report quantity, artificial intelligence channel feature information (AI-CFI), and ML configurations including indication of an ML model used for the ML assisted-CSI reporting. The method further comprises: measuring the CSI reference signals based on the configuration, and transmitting a CSI report that includes the AI-CFI.

In a second embodiment, a user equipment (UE) includes a transceiver configured to indicate capability of the UE to support one of machine learning (ML) assisted channel state information (CSI) reporting or ML assisted CSI prediction, and receive configurations, wherein the configurations include one or more indications that enable or disable at least one of: ML-assisted CSI prediction and ML-assisted assisted CSI reporting. The UE includes a processor configured to: one of perform ML model training or receive trained ML model parameters, wherein the transceiver is configured to receive CSI reference signals corresponding to at least one of the configurations. If ML-assisted CSI prediction is enabled, the configurations further include: a timing offset for future CSI prediction, and ML configurations including indication of an ML model used for the ML-assisted CSI prediction. The processor is further configured to determine and transmit predicted CSI as feedback. If ML-assisted CSI reporting is enabled, the configurations further include: a configuration for a CSI report quantity, artificial intelligence channel feature information (AI-CFI), and ML configurations including indication of an ML model used for the ML assisted-CSI reporting. The processor is further configured to: measure the CSI reference signals based on the configuration, and transmit a CSI report that includes the AI-CFI.

In another embodiment, a base station (BS) includes a transceiver configured to obtain an indication of capability of a user equipment (UE) to support one of machine learning (ML) assisted channel state information (CSI) reporting or ML assisted CSI prediction. The transceiver is configured to transmit configurations, wherein the configurations include one or more indications that enable or disable at least one of:

ML-assisted CSI prediction and ML-assisted CSI reporting. The UE is configured to: one of perform ML model training or receiving trained ML model parameters, wherein the transceiver is configured to receive CSI reference signals corresponding to at least one of the configurations. If ML-assisted CSI prediction is enabled, the configurations further include: a timing offset for future CSI prediction, and ML configurations including indication of an ML model used for the ML-assisted CSI prediction. The UE is further configured to determine and transmit predicted CSI as feedback. If ML-assisted CSI reporting is enabled, the configurations further include: a configuration for a CSI report quantity, artificial intelligence channel feature information (AI-CFI), and ML configurations including indication of an ML model used for the ML assisted-CSI reporting. The UE is further configured to: measure the CSI reference signals based on the configuration, and transmit a CSI report that includes the AI-CFI.

In any of the foregoing embodiments, if ML-assisted CSI reporting is configured, the AI-CFI includes at least one of a quantized output of an ML model that corresponds to compressed knowledge of a channel, and a quantized output of an ML model that corresponds to relevant features of the channel.

In any of the foregoing embodiments, the configurations include information to configure the AI-CFI, wherein the information is one of: a quantization method to be used to quantize an output of the ML model, a number of quantization bits to be used, a compression ratio from original CSI to the AI-CFI, or a total number of CSI feedback bits.

In any of the foregoing embodiments, the configurations include additional information used for selecting the ML model, the additional information comprising signal-to-noise (SNR) ratio ranges.

In any of the foregoing embodiments, the configurations configure dynamic switching, based on a trigger, between: the ML-assisted CSI reporting and CSI reporting without ML assistance. The trigger comprises one of: for aperiodic and semi-persistent reporting on a physical uplink shared channel (PUSCH), the trigger is one of a CSI format field within a downlink control information (DCI) format 0_1 or a report configuration identifier within a list of aperiodic or semi-persistent trigger events, and for semi-persistent reporting on a physical uplink control channel (PUCCH), the trigger is a dedicated field within a medium access control-control element (MAC-CE).

In any of the foregoing embodiments, if the ML-assisted CSI prediction is enabled, the timing offset for future CSI prediction is received as one of: a fixed value configured via a radio resource control (RRC) message or a set of values.

In any of the foregoing embodiments, the configurations dynamically switch between reporting a current instant CSI to ML-based future predicted CSI reporting using a triggering mechanism selected from: for aperiodic and semi-persistent reporting on a physical uplink shared channel (PUSCH), one of a field within downlink control information (DCI) format 0_1 or a report configuration identifier within one of a list of aperiodic CSI report triggers or an information element for semi-persistent CSI reporting on the PUSCH, or for semi-persistent reporting on a physical uplink control channel (PUCCH), the trigger is a dedicated field within a medium access control-control element (MAC-CE).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 9 shows an example of additional fields added to the CSI-ReportConfig IE according to embodiments of the present disclosure;

FIG. 10 shows an example of the fields of the to the CSI-AperiodicTriggerStateList IE according to embodiments of the present disclosure;

FIG. 12 shows an example of the fields of the CSI-AperiodicTriggerStateList IE according to embodiments of the present disclosure;

FIG. 13 illustrates semi-persistent CSI reporting on PUCCH activation/deactivation MAC CE according to embodiments of the present disclosure;

FIG. 15 shows an example of additional fields added to the CSI-ReportConfig according to embodiments of the present disclosure.

DETAILED DESCRIPTION

Figure 1:
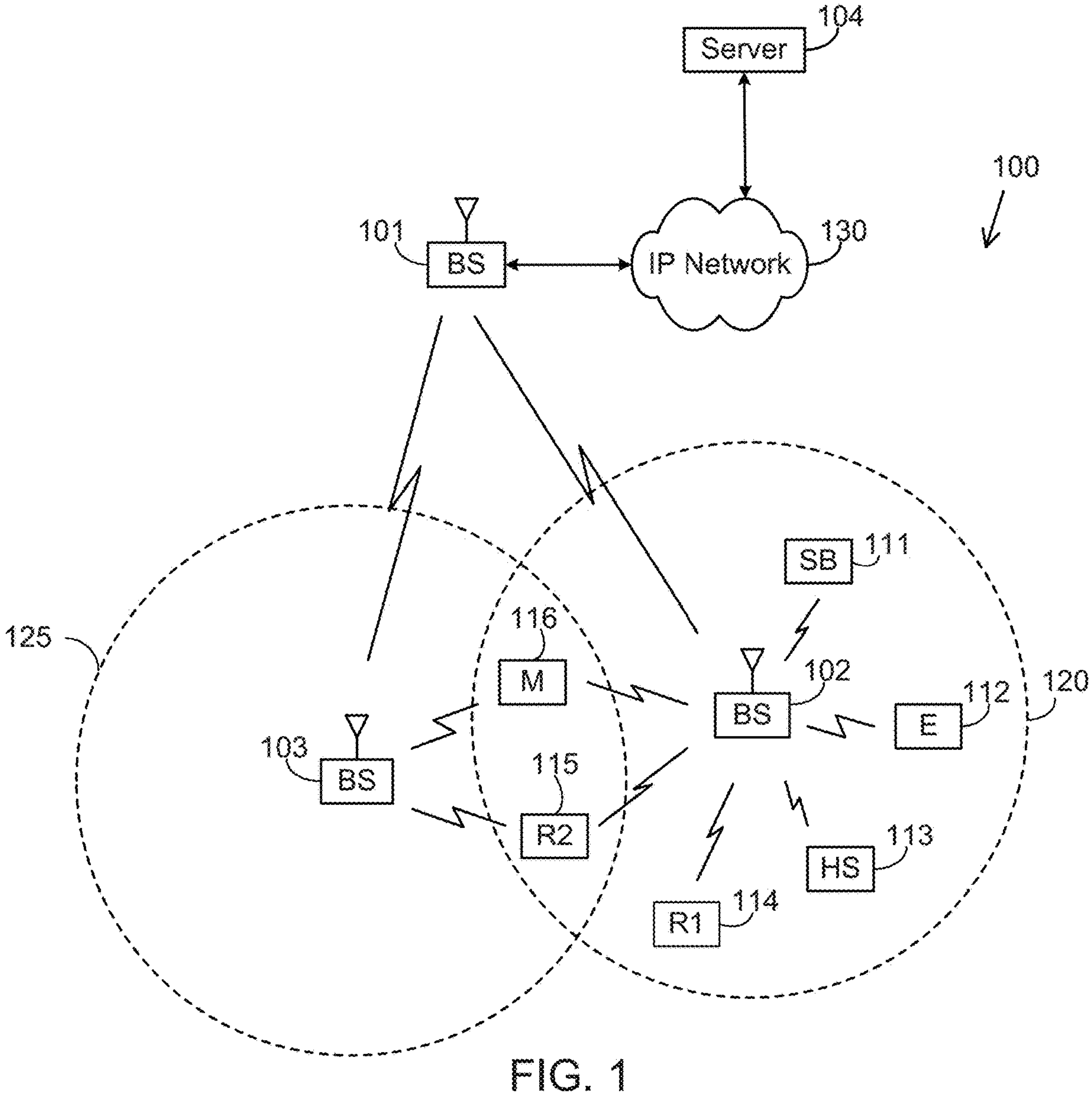
FIG. 1 illustrates an exemplary networked system utilizing machine learning for CSI feedback in FDD MIMO communications according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP TS 38.331 Rel-16 v16.3.1, "NR; Radio Resource Control (RRC) protocol specification," January 2021.

[2] 3GPP TS 38.214 Rel-16 v16.4.0, "NR; Physical layer procedures for data," January 2021.

[3] 3GPP TS 38.321 Rel-16 v16.3.0, "NR; Medium Access Control (MAC) protocol specification," January 2021.

The above-identified references are incorporated herein by reference.

ABBREVIATIONS

3GPP Third Generation Partnership Project
ML Machine Learning
AI Artificial Intelligence
gNB Base Station
UE User Equipment
NR New Radio
FDD Frequency Division Duplex
TDD Time Division Duplex
CSI Channel State Information
RI Rank Indicator
CQI Channel Quality Indicator
PMI Precoding Matrix Indicator
LI Layer Indicator
CRI CSI-RS Resource Indicator
AI-CFI Artificial Intelligent-Channel Feature Information
SCell Secondary Cell
SpCell Special Cell
PCell Primary Cell
RAT Radio Access Technology
RRC Radio Resource Control
DCI Downlink Control Information
MAC CE Medium Access Control-Control Element
DL Downlink
UL Uplink
LTE Long-Term Evolution The massive multiple-input multiple-output (MIMO) is widely regarded as one of the key techniques in the fifth-generation wireless communication system. With larger antenna array, such system is able to boost both spectrum and energy efficiency, and further support higher order multi-user (MU)-MIMO transmission in order to maximize the system performance.

One of the key components of a MIMO transmission scheme is the channel state information (CSI) acquisition at the base station or gNodeB (gNB). For MU-MIMO, in particular, the availability of accurate CSI is necessary in order to guarantee high MU performance. In frequency division duplex (FDD) systems, the CSI is acquired using the CSI reference signal (CSI-RS) transmission from gNB, and CSI calculation and feedback from mobile station or user equipment (UE).

The traditional CSI feedback framework is 'implicit' in the form of three components: pre-coding matrix indicator (PMI), rank indicator (RI), and channel quality indicator (CQI). The UE derives these components using downlink (DL) channel estimates assuming a single-user (SU) transmission in effect. The PMI feedback corresponds to DL channel eigenvectors along which DL channel strengths are strong and it is the index to an element in the pre-coding matrix codebook as defined in 3GPP. The strength of the channel is fed back in the form of CQI and the number of dominant eigenvectors is indicated by RI.

Because of the inherent SU assumption while deriving CSI, this implicit CSI feedback is inadequate for MU transmission. Realizing this issue, 3GPP provided specification support to high-resolution CSI reporting in Rel. 14 LTE based on a linear combination (LC) codebook called 'advanced CSI codebook' However, the overhead (number of bits) to report high-resolution CSI can be large. In 5G NR, Type II CSI codebook is introduced that reduces the feedback overhead by exploiting correlation in both spatial and frequency domains. The overhead is still high to the extent that it may be difficult to be implemented in 5G UEs. It is therefore desired to compress (reduce) the CSI overhead while maintaining large MU-MIMO performance gain.

The traditional compressed sensing (CS) works poorly, i.e., similarity of the reconstructed channel with the original channel is less than 20%, since the channel matrix is not sparse enough under large compression ratio. On the other hand, deep learning has achieved great success in computer vision and signal processing. Specifically, deep learning based methods have dominated the image compression task, which motivates researchers to compress the CSI matrix with neural network (NN) as well.

Application of artificial intelligence (AI)/machine learning (ML) algorithms in communication networks has drawn a lot of interest. It has been stated that AI/ML algorithms will be used for deployment of 5G networks in both the network and UE side. In general, AI is a tool to help network to make a quicker and wiser decision based on training data in the past. The potential benefits of standardization support are feedback/control signaling overhead reduction, more accurate feedback and enabling better AI algorithms which require coordination between base station and UE. These potential benefits will then translate to better system performance, e.g., in terms of throughput and reliability.

The present disclosure presents a framework to support AI/ML techniques in wireless communication systems, especially at base station and UE to enable reduction of overhead in the case of high-resolution CSI feedback in FDD MU-MIMO systems. Corresponding signaling details are discussed in this disclosure.

The present disclosure relates to the support of AI/ML techniques in a communication system for specific purpose of reduction in overheard associated with high-resolution CSI feedback in FDD MU-MIMO systems. Techniques, apparatus and methods are disclosed for configuration of AI/ML approaches for CSI reporting using deep learning based compression techniques specifically the detailed configuration method for aperiodic/semi-persistent CSI reporting and signaling method operations at different components in the system have been discussed.

The embodiments of the disclosure are applicable in general to any communication system leveraging AI/ML techniques for reduction of overhead associated with CSI feedback.

A description of example embodiments is provided below.

The text and figures are provided solely as examples to aid the reader in understanding the disclosure. They are not intended and are not to be construed as limiting the scope of this disclosure in any manner. Although certain embodiments and examples have been provided, it will be apparent to those skilled in the art based on the disclosures herein that changes in the embodiments and examples shown may be made without departing from the scope of this disclosure.

Aspects, features, and advantages of the disclosure are readily apparent from the following detailed description, simply by illustrating a number of particular embodiments and implementations. The subject matter of the disclosure is also capable of other and different embodiments, and several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
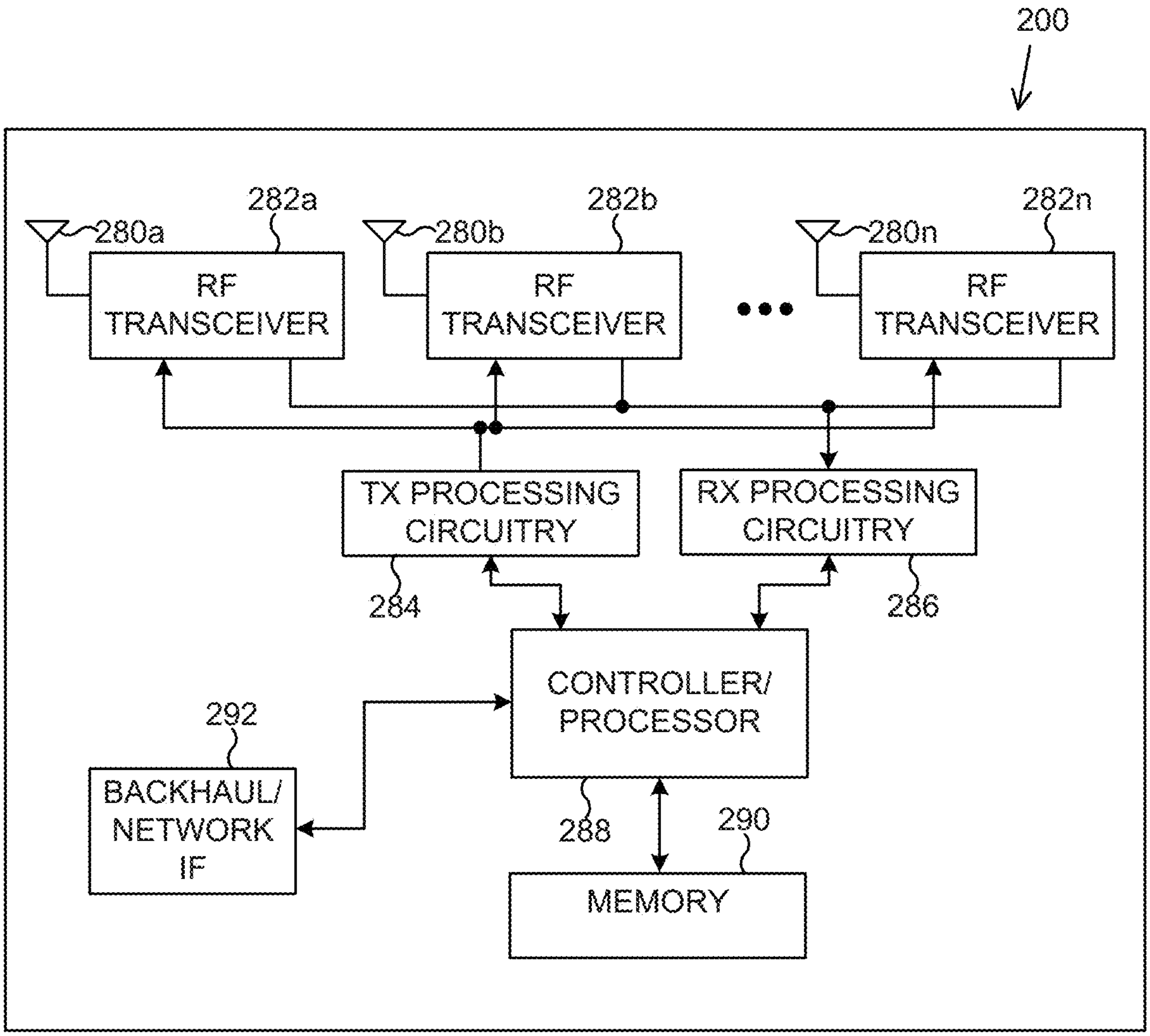
FIG. 2 illustrates an exemplary base station (BS) utilizing machine learning for CSI feedback in FDD MIMO communications according to various embodiments of this disclosure.

Throughout this disclosure, all figures such as FIG. 1, FIG. 2, and so on, illustrate examples according to embodiments of the present disclosure. For each figure, the corresponding embodiment shown in the figure is for illustration only. One or more of the components illustrated in each figure can be implemented in specialized circuitry configured to perform the noted functions or one or more of the components can be implemented by one or more processors executing instructions to perform the noted functions. Other embodiments could be used without departing from the scope of the present disclosure. In addition, the descriptions of the figures are not meant to imply physical or architectural limitations to the manner in which different embodiments may be implemented. Different embodiments of the present disclosure may be implemented in any suitably-arranged communications system.

The below flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

FIG. 1 illustrates an exemplary networked system utilizing machine learning for CSI feedback in FDD MIMO communications according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station (BS) 101, a BS 102, and a BS 103. The BS 101 communicates with the BS 102 and the BS 103. The BS 101 also communicates with at least one Internet protocol (IP) network 130, such as the Internet, a proprietary IP network, or another data network.

The BS 102 provides wireless broadband access to the network 130 for a first plurality of user equipments (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, LTE, LTE Advanced (LTE-A), WiMAX™, Wi-Fi™, NR, or other wireless communication techniques.

Depending on the network type, other well-known terms may be used instead of "base station" or "BS," such as node B, evolved node B ("eNodeB" or "eNB"), a 5G node B ("gNodeB" or "gNB") or "access point." For the sake of convenience, the term "base station" and/or "BS" are used in this disclosure to refer to network infrastructure components that provide wireless access to remote terminals. Also, depending on the network type, other well-known terms may be used instead of "user equipment" or "UE," such as "mobile station" (or "MS"), "subscriber station" (or "SS"), "remote terminal," "wireless terminal," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extent of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

Although FIG. 1 illustrates one example of a wireless network 100, various changes may be made to FIG. 1. For example, the wireless network 100 could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BS 101, 102, and/or 103 could provide access to other or additional external networks, such as external telephone networks or other types of data networks.

FIG. 2 illustrates an exemplary base station (BS) utilizing machine learning for CSI feedback in FDD MIMO communications according to various embodiments of this disclosure. The embodiment of the BS 200 illustrated in FIG. 2 is for illustration only, and the BSs 101, 102 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 200 includes multiple antennas 280*a*-280*n*, multiple radio frequency (RF) transceivers 282*a*-282*n*, transmit (TX or Tx) processing circuitry 284, and receive (RX or Rx) processing circuitry 286. The BS 200 also includes a controller/processor 288, a memory 290, and a backhaul or network interface 292.

The RF transceivers 282*a*-282*n* receive, from the antennas 280*a*-280*n*, incoming RF signals, such as signals transmitted by UEs in the network 100. The RF transceivers 282*a*-282*n* down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282*a*-282*n* receive the outgoing processed baseband or IF signals from the TX processing circuitry 284 and up-converts the baseband or IF signals to RF signals that are transmitted via the antennas 280*a*-280*n*.

The controller/processor 288 can include one or more processors or other processing devices that control the overall operation of the BS 200. For example, the controller/processor 288 could control the reception of forward channel signals and the transmission of reverse channel signals by the RF transceivers 282*a*-282*n*, the RX processing circuitry 286, and the TX processing circuitry 284 in accordance with well-known principles. The controller/processor 288 could support additional functions as well, such as more advanced wireless communication functions and/or processes described in further detail below. For instance, the controller/processor 288 could support beam forming or directional routing operations in which outgoing signals from multiple antennas 280*a*-280*n* are weighted differently to effectively steer the outgoing signals in a desired direction. Any of a wide variety of other functions could be supported in the BS 200 by the controller/processor 288. In some embodiments, the controller/processor 288 includes at least one microprocessor or microcontroller.

The controller/processor 288 is also capable of executing programs and other processes resident in the memory 290, such as a basic operating system (OS). The controller/processor 288 can move data into or out of the memory 290 as required by an executing process.

The controller/processor 288 is also coupled to the backhaul or network interface 292. The backhaul or network interface 292 allows the BS 200 to communicate with other devices or systems over a backhaul connection or over a network. The interface 292 could support communications over any suitable wired or wireless connection(s). For example, when the BS 200 is implemented as part of a cellular communication system (such as one supporting 6G, 5G, LTE, or LTE-A), the interface 292 could allow the BS 200 to communicate with other BSs over a wired or wireless backhaul connection. When the BS 200 is implemented as an access point, the interface 292 could allow the BS 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

As described in more detail below, base stations in a networked computing system can be assigned as synchronization source BS or a slave BS based on interference relationships with other neighboring BSs. In some embodiments, the assignment can be provided by a shared spectrum manager. In other embodiments, the assignment can be agreed upon by the BSs in the networked computing system. Synchronization source BSs transmit OSS to slave BSs for establishing transmission timing of the slave BSs.

Although FIG. 2 illustrates one example of BS 200, various changes may be made to FIG. 2. For example, the BS 200 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 200 could include multiple instances of each (such as one per RF transceiver). Also, various components in FIG. 2 could be combined, further subdivided, or omitted and additional components could be added according to particular needs.

Figure 3:
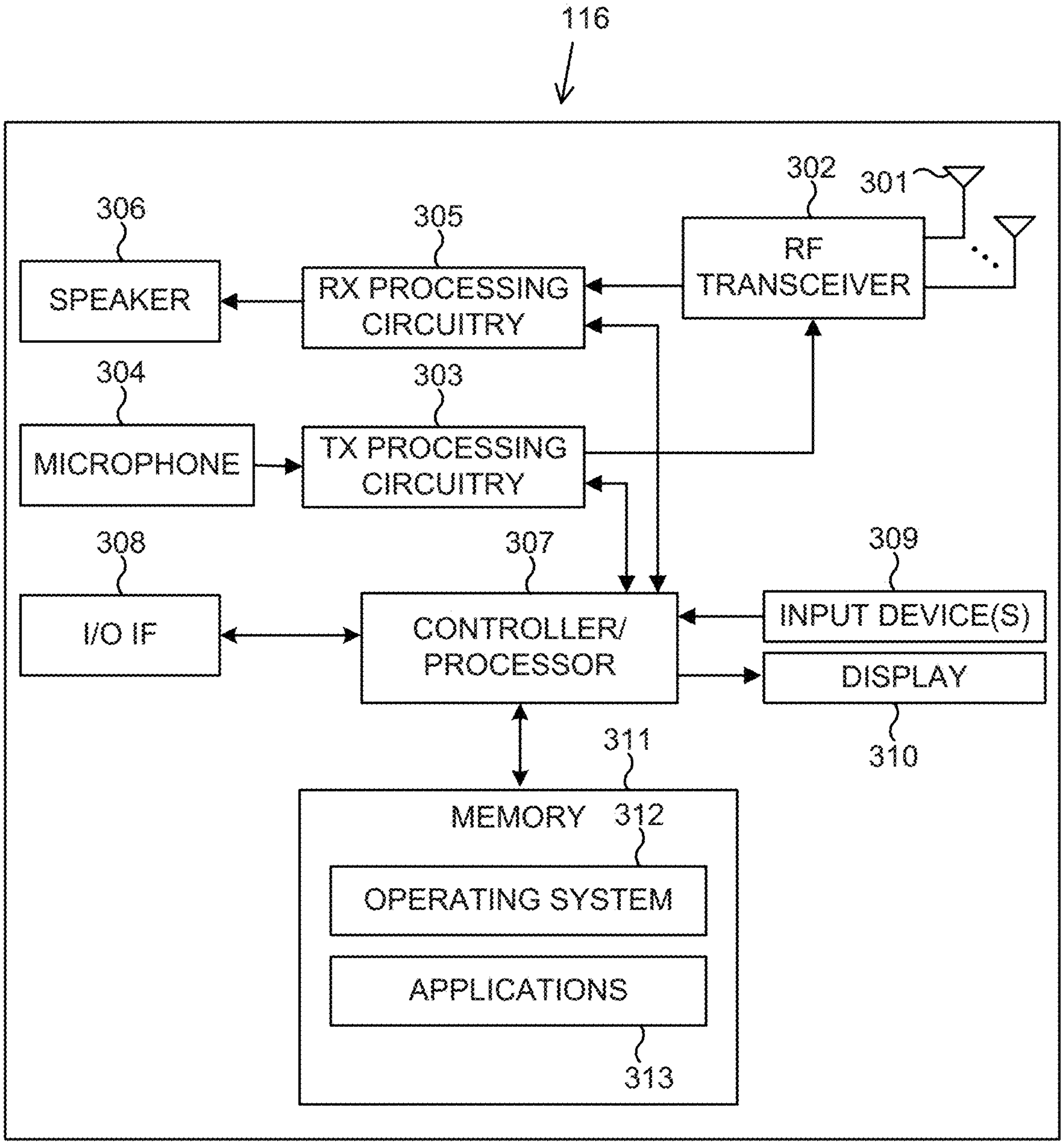
FIG. 3 illustrates an exemplary electronic device for communicating in the networked computing system utilizing machine learning for CSI feedback in FDD MIMO communications according to various embodiments of this disclosure.

FIG. 3 illustrates an exemplary electronic device for communicating in the networked computing system utilizing machine learning for CSI feedback in FDD MIMO communications according to various embodiments of this disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In one embodiment, the framework to support AI/ML techniques include using auto-encoder architecture with offline training and the inference operation done at the BS and UE side, with encoding at the UE and decoding at BS.

Figure 4:
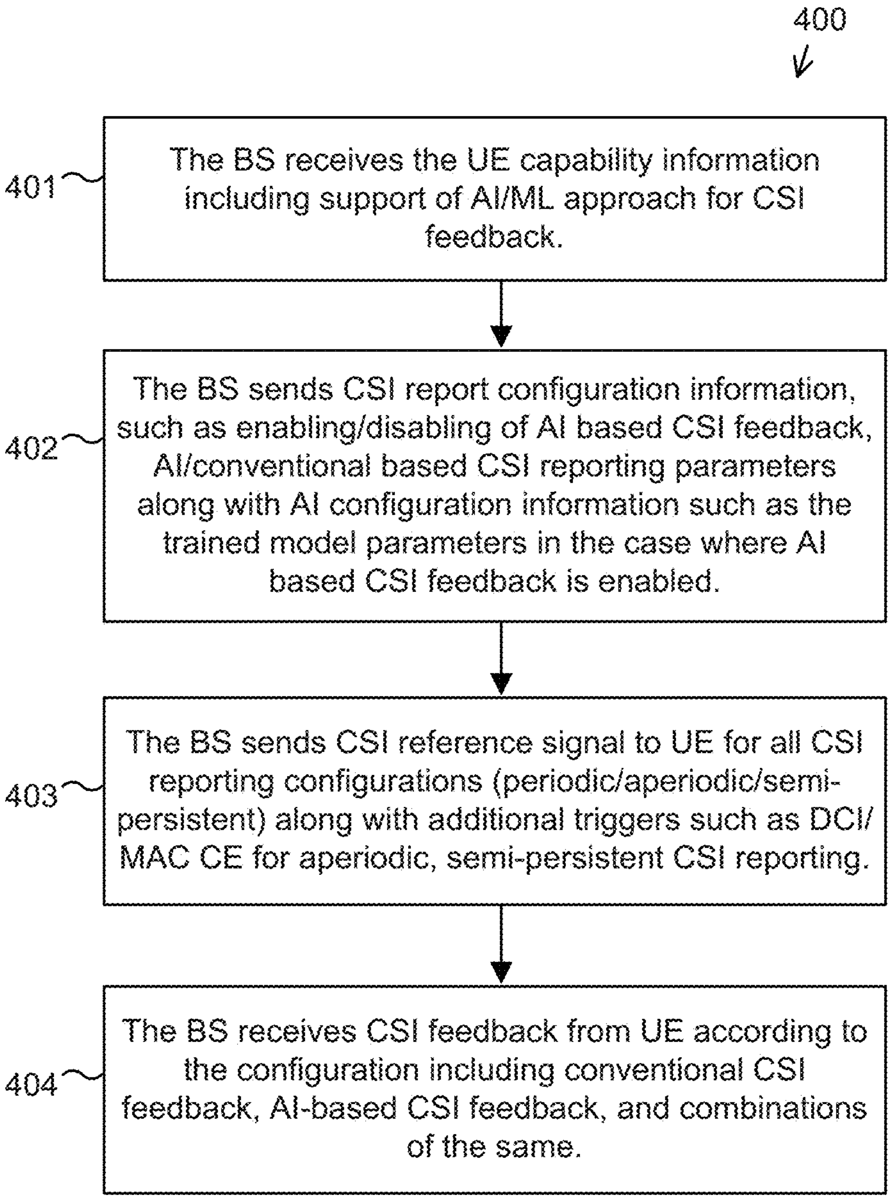
FIG. 4 illustrates a flowchart for an example of BS operation(s) to support AI/ML techniques for CSI feedback according to embodiments of the present disclosure.

FIG. 4 illustrates a flowchart for an example of BS operation(s) to support AI/ML techniques for CSI feedback according to embodiments of the present disclosure. FIG. 4 is an example of a method 400 for operations at BS side to support CSI feedback using AI/ML techniques. At operation 401, a BS receives the UE capability information, e.g., the support for the ML approach for CSI feedback, as is subsequently described below. The report of the capability information can be received via PUCCH and/or PUSCH. A new UCI type, a new PUCCH format and/or a new MAC CE can be defined for the capability information report.

At operation 402, the BS sends CSI related configuration to the UE including the enabling and disabling of the AI based CSI feedback mechanism. When AI based CSI feedback is enabled, at operation 403, the BS then sends the AI/ML related configuration information to UE, which can include information about the AI/ML model used, in one embodiment the AI/ML model used could be an auto-encoder with encoding at UE and decoding at BS and the trained model parameters of the model. In one embodiment, the model training can be performed offline (e.g., model training is performed outside of the network), and the trained model parameters which may include and is not limited to values of the weights, biases, activation functions and different neural network layers used, can be sent to the BS and to UEs. In this embodiment, the BS is aware of the ML model being used at the UE for CSI feedback (received by the BS at operation 404) and is capable of interpreting the feedback information sent by the UE, i.e., in the example of an auto-encoder based CSI feedback BS will use appropriate decoder to interpret the feedback sent by the UE. Part of or all the configuration information can be broadcasted as a part of cell-specific information, for example by system information such as MIB, SIB1 or other SIBs. Alternatively, part of or all the configuration information can be sent as UE-specific signaling, or group-specific signaling. More details about the signaling method are discussed below.

The higher layer CSI reporting configuration is sent to the UE using RRC messages, such as the CSI reporting parameters (PMI, RI, CQI, LL CRI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters). In one embodiment, the AI based CSI feedback is enabled by setting the CSI reporting parameter as AI-CFI, AI based Channel Feature Information, that refers to the compressed AI/ML model extracted feature of the CSI (channel state information) that contains sufficient information for the reconstruction of the CSI at the BS. As opposed to conventional CSI feedback mechanisms, for AI based CSI feedback, we use AI/ML models to represent the high-resolution channel in minimum number of bits. This compressed representation of the channel is the AI-CFI information that is sent to the BS.

Figure 5:
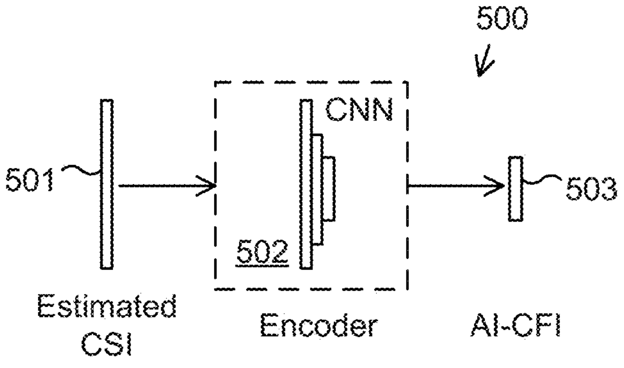
FIG. 5 is an example illustrating generation of AI-CFI from estimated CSI at a UE according to embodiments of the present disclosure.

FIG. 5 is an example illustrating generation of AI-CFI from estimated CSI at a UE according to embodiments of the present disclosure. In one example 500, the high resolution estimated channel information 501 (i.e., the spatial-frequency domain channel at each subcarrier level) can be an input to an encoder 502 at the UE, such as a convolutional neural network (CNN), that extracts various feature maps and a fully connected layer to generate AI-CFI 503 of certain fixed length, as illustrated in FIG. 5. The AI-CFI is then sent to the BS. By using the AI-CFI, the BS can reconstruct the channel using an AI/ML based decoder. The BS can further configure the AI-CFI with AI-CFI configuration information element (IE) in the RRC message. In one embodiment, the size of the AI-CFI configured refers to the number of bits used in the transmission of the AI-CFI, i.e., overhead associated with CSI feedback. In other embodiment, the size of the AI-CFI can refer to the compression ratio, i.e., the ratio of the feedback bits of original CSI to AI-CFI. Part of or all of the CSI report configuration information is set in the RRC IE CSI-ReportConfig. In one embodiment, all CSI report configuration information associated with AI methods are set in new IE CSI-AIReportConfig that specifies the reporting configuration for CSI feedback using AI methods. More details about the signaling method and the LE's are discussed below.

Conventional CSI feedback mechanism such as Type-2 in Release 15, the CSI compression was only in spatial domain (SD) where spatial Discrete Fourier transform (DFT) basis set is generated at UE based on the antenna configuration and oversampling factors. After that, L orthogonal DFT beams are selected which are common to both antenna polarizations and across sub-bands. Dominant eigenvectors per subband are represented as linear combination (LC) of these selected L beams. The overhead associated with the feedback includes bits to communicate the L basis selection, amplitude and phase values, which for one particular configuration of L=4 with 32 transmit antennas and 4 receive antennas will be 351 bits. Using AI methods, the same dominant eigenvectors per subband information can be sent by using much less overhead (~100 bits) and with better resolution, by exploiting the correlation using CNN architecture as in FIG. 5.

At operation 106, BS sends the CSI reference signal to the UE, after which the UE send the CSI reports. While, the periodic CSI reporting is based on the parameters configured in the RRC messages, the aperiodic CSI reporting is triggered by the DCI or DCI+MAC CE semi-persistent CSI reporting on PUSCH is triggered by DCI and semi-persistent CSI reporting on PUCCH is activated/deactivated by MAC CE. Various triggering methods are used to dynamically move from one CSI reporting configuration to another such as moving from conventional Type-2 codebook based CSI feedback mechanism to AI/ML based CSI feedback mechanism using the reporting parameter AI-CFI. In one embodiment, a field in DCI/MAC CE can be used to dynamically switch between conventional and AI based CSI feedback mechanisms.

As part of the triggering process, in one embodiment, the field CSI request in DCI format 0_1 specifies the index of an aperiodic trigger state configured in CSI-AperiodicTriggerStateList or the index of Semi-persistent on PUSCH trigger state configured in CSI-SemiPersistentOnPUSCH-TriggerStateList, or a codepoint defined in the MAC CE (Aperiodic CSI Trigger State Subselection MAC CE), where additional CSI configuration reporting states, with reporting formats set to CFI, are added to the trigger state lists in RRC message. In another embodiment, a field CSI format in DCI format 0_1 specifies the CSI reporting format to be either codebook based or AI/ML based for the aperiodic/semi-persistent on PUSCH trigger state index specified in CSI request field, where there is no need to include additional configuration reporting states to the existing trigger state lists. More details about the triggering configuration and triggering process is discussed below.

Figure 6:
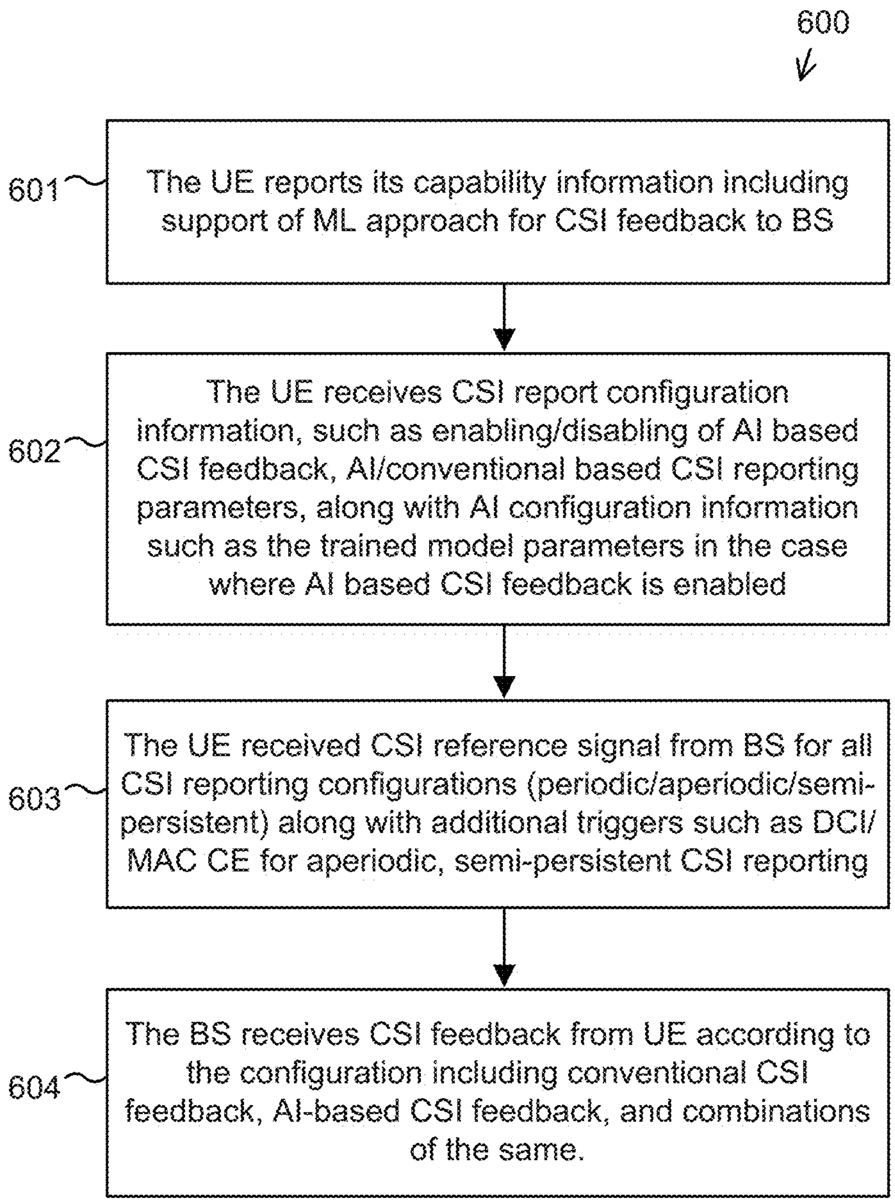
FIG. 6 illustrates a flowchart for an example of UE operation to support AI/ML techniques for CSI feedback according to embodiments of the present disclosure.

FIG. 6 illustrates a flowchart for an example of UE operation to support AI/ML techniques for CSI feedback according to embodiments of the present disclosure. FIG. 6 illustrates an example of a method 600 for operations at UE side to support CSI feedback using AI/ML techniques.

At operation 601, a UE's AI/ML capability to support the AI/ML assisted CSI feedback is reported to the BS. Such capabilities include the support of AI/ML model training and/or inference as outlined below. The report of the capability information can be via PUCCH and/or PUSCH. A new UCI type, a new PUCCH format and/or a new MAC CE can be defined for the capability information report.

At operation 602, the UE receives CSI related configuration(s) from the BS, including the enabling or disabling of the AI-based CSI feedback mechanism. When AI-based CSI feedback is enabled, the UE also receives the AI/ML related configuration information, such as the AI/ML model used, and the trained model parameters of the model. Part of or all the configuration information can be broadcasted as a part of cell-specific information, for example by system information such as master information block (MIB), system information block 1 (SIB1), or other SIBs. Alternatively, part of or all the configuration information can be sent as UE-specific signaling, or group-specific signaling. More details about the signaling method are discussed below.

The UE receives the higher layer CSI reporting configuration to the UE using RRC messages, such as the CSI reporting parameters (PMI, RI, CQI, L1, CRI, AI-CFI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters), AI-CFI configuration (size of the AI-CFI), etc. Part of or all of the CSI report configuration information is set in the RRC IE CSI-ReportConfig. In one embodiment, all CSI report configuration information associated with AI methods are set in new IE CSI-AIReportConfig that specifies the reporting configuration for CSI feedback using AI methods. More details about the signaling method and the IE's are discussed below.

At operation 603, the UE receives the CSI reference signal(s) from the BS, after which the UE sends the CSI reports. While the periodic CSI reporting is based on the parameters configured in the RRC messages, the aperiodic CSI reporting is triggered by the DCI or DCI+MAC CE. Semi-persistent CSI reporting on PUSCH is triggered by DCI and semi-persistent CSI reporting on PUCCH is activated/deactivated by MAC CE. The DCI trigger is used to dynamically move from one CSI reporting configuration to another, such as moving from Type-2 codebook based CSI feedback mechanism to AI/ML based CSI feedback mechanism using the reporting parameter CFI. More details about the triggering configuration and triggering process are discussed below.

At operation 604, the UE performs the inference, i.e., extraction of compressed feature(s) from the CSI channel based on the received CSI reporting configuration information, trigger received and the triggering configuration. For example, the UE follows the configured ML model and model parameters, and CSI reporting parameters sent from the BS, to perform the inference operation. The UE sends the CSI report with the CSI reporting parameter AI-CFI, which is the outcome of the inference of the AI/ML model to the BS.

In some embodiments, the signaling method to support predicted feedback of CSI at a future time, predicted by an AI/ML model at the UE, is supported. In current NR, the CSI feedback reported to the BS is based on the CSI estimation by the UE at the current time.

Accounting for the delay in relaying the information to the BS, and the time taken by the BS to use this information to generate a pre-coding matrix for scheduling UEs, the UE in question can move, which results in changes of channel conditions making the feedback CSI information outdated. Thus, in these embodiments, the local information at the UE such as the UE's velocity, location, and trajectory information are employed to predict channel conditions for the UE at a future time, when the UE is more likely to be scheduled by the BS.

Figure 7:
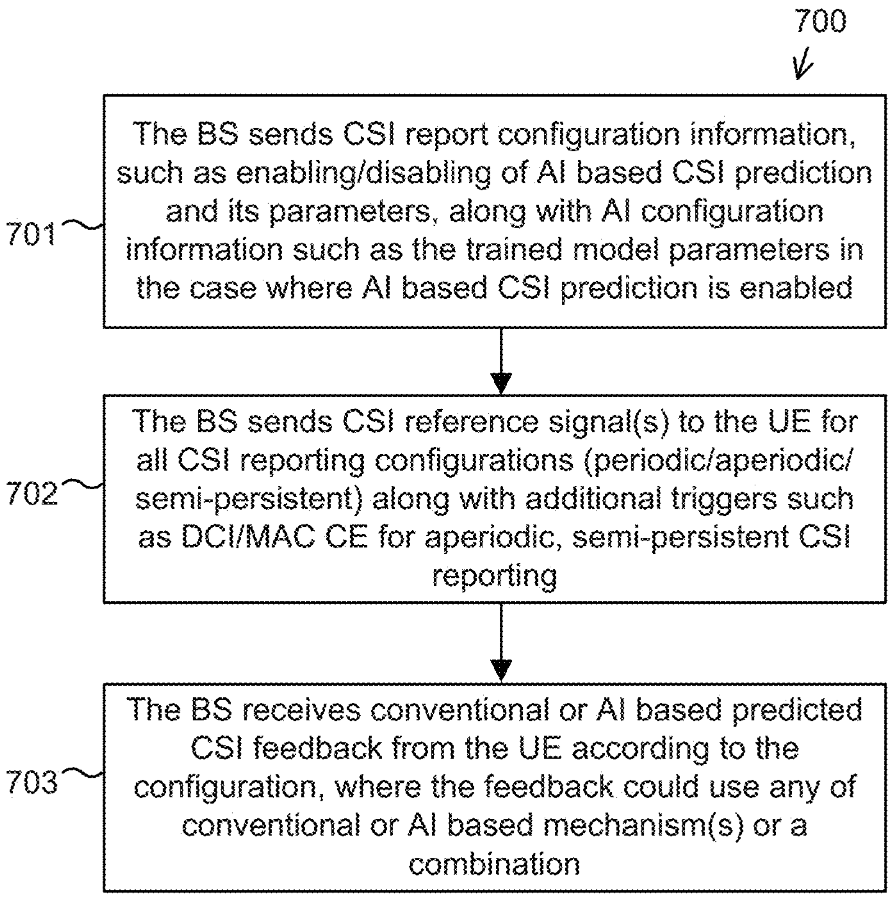
FIG. 7 illustrates a flowchart for an example of BS operation to support AI/ML techniques for future prediction of CSI according to embodiments of the present disclosure.

FIG. 7 illustrates a flowchart for an example of BS operation to support AI/ML techniques for future prediction of CSI according to embodiments of the present disclosure. FIG. 7 is an example of a method 700 for operations at the BS side to support the CSI feedback of the predicted CSI using AI/ML techniques. At operation 701, the BS sends CSI related configuration to the UE, including the enabling or disabling of the AI-based CSI prediction. When AI-based CSI prediction is enabled, the BS then sends the AI/ML related configuration information to UE, such as the AI/ML model used, the trained model parameters of the model, etc. In one embodiment, the model training can be performed offline (e.g., model training is performed outside of the network), and the trained model parameters can be sent to the UE from the BS. Part of or all the configuration information can be broadcasted as a part of cell-specific information, for example by system information such as MIB, SIB1 or other SIBS. Alternatively, part of or all the configuration information can be sent as UE-specific signaling, or group-specific signaling.

The higher layer CSI reporting configuration sent to the UE using RRC messages, may include the CSI reporting parameters (PMI, RI, CQI, L1, CRI, AI-CFI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters), AI-CFI configuration (size of the AI-CFI), the timing offset for future prediction, etc. In one embodiment, the timing offset can be with regard to a number of slots starting from the slot containing the CSI-RS reference signal or the CSI reporting instant. In another embodiment, the timing offset can be the offset with regards to number slots starting from the slot with the trigger, i.e., DCI or MAC CE for aperiodic CSI reporting. In yet another embodiment, the timing offset can be in units of time such as milliseconds (ms), denoting the offset (time in future) starting from the instant UE receives CSI reference signal or trigger, such as DCI/MAC CE or from the instant UE was configured to send the CSI report. The AI/ML model is used to predict the channel, i.e., CSI at a future time instant denoted by the above mentioned timing offset parameter.

At operation 702, the BS sends the CSI reference signal(s) to the UE, after which the UE send the CSI reports. While the periodic CSI reporting is based on the parameters configured in the RRC messages, the aperiodic CSI reporting is triggered by the DCI or DCI+MAC CE. Semi-persistent CSI reporting on PUSCH is triggered by DCI and semi-persistent CSI reporting on PUCCH is activated/deactivated by MAC CE. The triggers are used to dynamically move from one CSI reporting configuration to another, such as moving from feedback based on CSI at the current time to feedback of AWL predicted CSI at a future time set by the timing offset parameter. This dynamic move can be realized by introducing an additional single bit field in the DCI or MAC CE. More details are mentioned below.

In one embodiment, the timing offset value is set in an RRC message with a value of zero indicating the deactivation of the AI/ML model to predict the CSI. In another embodiment, the timing offset value set in the RRC message and the activation/deactivation of the CSI prediction is indicated by DCI/MAC CE. In yet another embodiment, a hybrid model can be used, where the timing offset is the RRC message and can take values from a pre-determined set of values, and DCI/MAC CE indicates the value to be selected for CSI prediction. In one embodiment, when the CSI prediction is activated, the feedback of predicted CSI can be based on traditional methods such as codebook based or can be based on AI/ML model as in previous embodiment (s). Part of or all of the CSI report configuration information is set in the RRC IE CSI-ReportConfig, and the triggering configuration in the DCI format 0_1/MAC CE. In one embodiment, all CSI report configuration information associated with AI methods are set in new IE CSI-AIReportConfig that specifies the reporting configuration for CSI feedback using AI methods. More details about the signaling method, the triggering configuration, triggering process and the IE's are discussed below.

At operation 703, the BS receives the CSI reports from the UE based on the configuration set by the BS.

Figure 8:
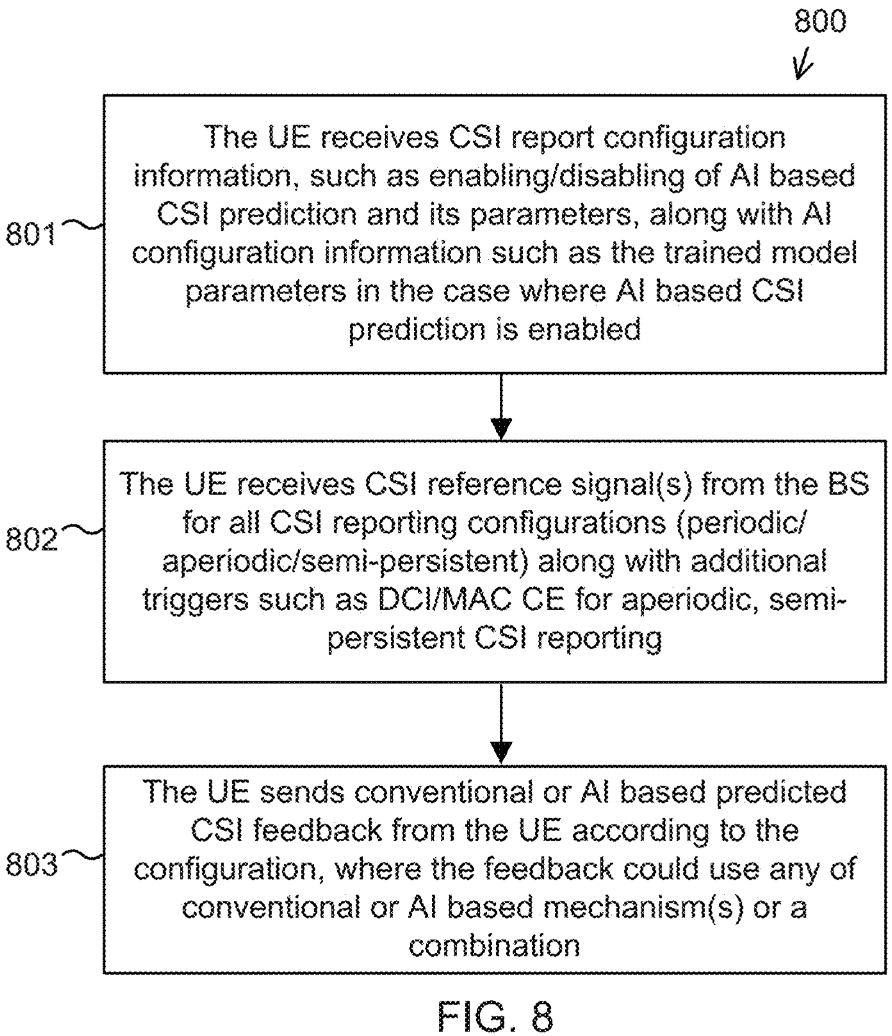
FIG. 8 illustrates a flowchart for an example of UE operation to support AI/ML techniques for future prediction of CSI according to embodiments of the present disclosure.

FIG. 8 illustrates a flowchart for an example of UE operation to support AI/ML techniques for future prediction of CSI according to embodiments of the present disclosure. FIG. 8 is an example of a method 400 for operations at UE side to support the CSI feedback of the predicted CSI using AI/ML techniques. At operation 801, the UE receives the configuration information from BS, which can include information about the AI/ML model used, the trained model parameters of the model, etc.

The UE also receives the higher layer CSI reporting configuration from BS using RRC messages, such as the CSI reporting parameters (PMI, RI, CQI, L1, CRI, AI-CFI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters), AI-CFI configuration (size of the AI-CFI), timing offset for future prediction, etc. At operation 802, the UE receives the CSI reference signal(s) from the BS, after which the UE sends the CSI reports. While the periodic CSI reporting is based on the parameters configured in the RRC messages, the aperiodic CSI reporting is triggered by the DCI or DCI+MAC CE. Semi-persistent CSI reporting on PUSCH is triggered by DCI and semi-persistent CSI reporting on PUCCH is activated/deactivated by MAC CE. The triggers are used to dynamically move from one CSI reporting configuration to another such as moving from feedback based on CSI at current time to feedback AI/ML predicted CSI at a future time set by the timing offset parameter. More details about the signaling method, the triggering configuration, triggering process and the IE's are discussed below.

At operation 803, the UE uses local information such as velocity, trajectory of motion, location to predict the CSI at a future time step and send CSI report for the predicted CSI using the reporting parameter set by the BS, i.e., either using codebook based PMI or AI/ML based AI-CFI.

The configuration information related to AI/ML techniques (e.g., at operations 401, 602, 701, 801) can include one or multiple of the following information.

ML model/algorithm and model parameters

The configuration information can include which AI/ML model or algorithm to be used for the CSI feedback along with the model parameters of ML algorithms that may or may not be limited to the loss function, activation function, the trained parameters for the ML model, etc.

In one embodiment, part of or all the configuration information can be broadcasted as a part of cell-specific information, for example by system information such as MIB, SIB1 or other SIBs. Alternatively, a new SIB can be introduced for the indication of configuration information. For example, which ML model to be used and/or model parameters for CSI feedback can be broadcasted. In another example, the updates of model parameters can be broadcasted. In another embodiment, part of or all the configuration information can be sent by UE-specific signaling such as UE-specific RRC signaling. In yet another embodiment, part of or all the configuration information can be sent by group-specific signaling. A UE group-specific RNTI can be configured, e.g., using value 0001-FFEF or the reserved value FFF0-FFFD. The group-specific RNTI can be configured via UE-specific RRC signaling.

For high layer CSI report configuration, the BS sends CSI reporting configuration to the UE using RRC messages. As illustrated in FIG. 9, the information element CSI-ReportConfig contains various parameters such as the CSI reporting parameters (PMI, RI, L1, CRI, CQI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters), enabling group based beam reporting, etc. [3GPP 38.331].

In this disclosure, an additional CSI reporting parameter labeled AI-Channel Feature information (AI-CFI), that is the output of the AI/ML model deployed at UE. In one embodiment, the BS can enable only AI/ML based CSI feedback reporting by setting AI/ML based CSI feedback reporting as the sole CSI reporting parameter. In another embodiment, the BS can enable AI/ML based CSI feedback along with original feedback mechanism by setting the reporting parameters to include both PMI, RI and AI-CFI. In yet another embodiment, the BS can choose to not set CFI as a reporting parameter, effectively disabling the AI/ML based CSI feedback mechanism. This reporting parameter is the compressed extracted feature from the estimated CSI at the UE, which can be used by BS to reconstruct the CSI. In this disclosure, an additional field labelled AiCfiConfig is also included, to configure the specifics of this reporting parameter such as the number of bits, compression ratio to be considered while extracting the feature, etc. In one embodiment, this field could be an integer in a range [1,M], implying that the compression ratio is 1/n, n∈[o, M]. FIG. 9 illustrates the additional fields in the IE CSI-ReportConfig.

For aperiodic CSI reporting triggering, the field CSI request in DCI format 0_1 can specify the index of Aperiodic trigger state configured in CSI-AperiodicTriggerStateList or codepoint defined in the MAC CE (Aperiodic CSI Trigger State Subselection MAC CE). Each codepoint of the DCI field "CSI request" is associated with one trigger state (see TS 38.321, clause 6.1.3.13). For example, if the bit length of this field is set large enough to point to all the items of CSI-AperiodicTriggerStateList, the field can directly indicate the item list in the CSI-AperiodicTriggerStateList. However, if the bit length is not large enough, the field may point to the codepoint index in the MAC CE which defines a subset of CSI-AperiodicTriggerStateList. The bit length of the field CSI request in DCI format is specified by RRC messages, specifically by the field reportTriggerSize∈{1,2,3,4,5,6} in IE CSI-MeasConfig.

The IE illustrated in FIG. 10 can be used to configure the UE with a list of aperiodic trigger states. Upon reception of the value associated with a trigger state, the UE may perform measurement of CSI-RS, CSI-IM and/or SSB (reference signals) and aperiodic reporting on LI according to all entries in the associatedReportConfigInfoList CSI-AperiodicTriggerStateList for that trigger state. Each entry in the associatedReportConfigInfoList specifies a list of reportconfigIds.

In one embodiment, new configuration states can be added to the CSI-Aperiodic trigger state lists in the RRC IE CSI-AperiodicTriggerStateList, with associated report configuration list including report configuration with CSI reporting formats set to CFI, i.e., AI/ML based CSI feedback. In one example, to accommodate for the increase in the size of the list in the CSI-AperiodicTriggerStateList, the possible bit sizes for the CSI request field in the DCI format 0_1, configured by the field reportTriggerSize∈{1,2,3,4,5,6} in IE CSI-MeasConfig can be increased, i.e., the field reportTriggerSize in IE CSI-MeasConfig can belong to {1,2,3,4,5,6,7,8}.

In another embodiment, a new single bit field CSI format can be introduced in to DCI format 0_1, where the field set to 1 implies to perform measurement of CSI-RS, CSI-IM and/or SSB (reference signals) and aperiodic reporting on L1 according to all entries in the associatedReportConfigInfoList in CSI-AperiodicTriggerStateList for that trigger state using AI/ML based format for CSI feedback.

Figure 11:
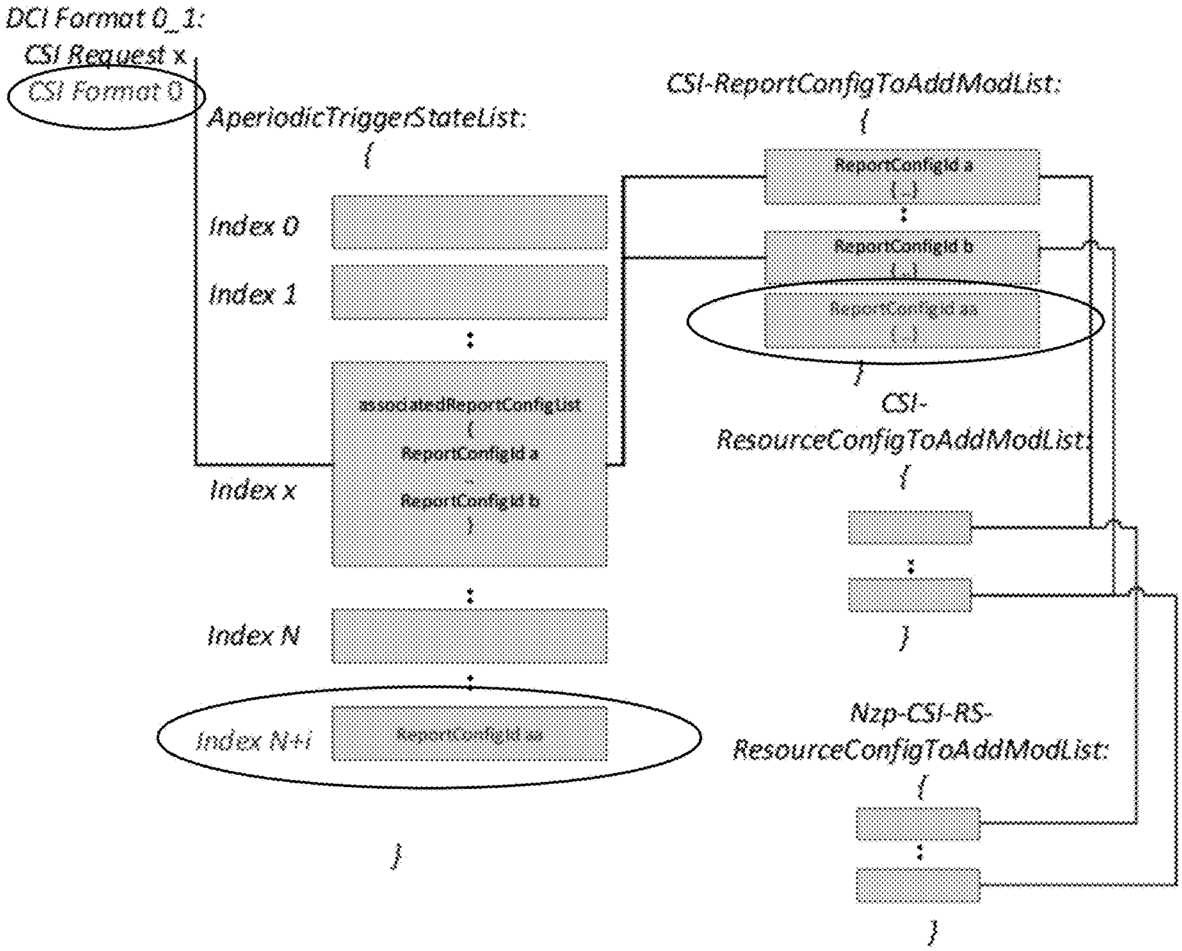
FIG. 11 illustrates an aperiodic CSI reporting triggering process highlighting two possible new embodiments to enable AI/ML based CSI feedback according to embodiments of the present disclosure.

An embodiment of the aperiodic triggering process is illustrated pictorially in FIG. 11. The CSI request bit field in the DCI is associated with one trigger state (associatedReportConfigInfoList). As per 3GPP, a CSI request can trigger more than one measurement report as shown in FIG. 11 (multiple reportConfigId associated with a single list in aperiodicTriggerStateList). In the csi-ReportConfigToAddModList, the UE is configured with a list of reportConfigId associated with information elements, such as resourcesForChannelMeasurement, csi-IM-ResourcesForinterference and nzp-CSI-RS-ResourcesForInterference, that map to csi-ResourceConfigId in the csi-ResourceConfigToAddModList.

In one embodiment, the list of trigger states is increased (adding indices >N in FIG. 11), with reportConfigId's under these new states configured to AI/ML based CSI feedback. In another embodiment, a new single bit field CSI format in the DCI is introduced, which indicates whether to use conventional or AI/ML based feedback mechanism for the reportConfigId's in the trigger state referred to by the field in CSI Request. Both the embodiments are highlighted by the ellipses in FIG. 11.

Semi-persistent CSI reporting triggering: The triggering for semi-persistent CSI reporting on PUSCH, is done by the field CSI Request in DCI format 0_1, where the index refers to the trigger state configured in CSI-SemiPersistentOnPUSCH-TriggerStateList IE as illustrated in FIG. 12. The embodiments to support AI/ML based CSI feedback for semi-persistent CSI reporting on PUSCH is similar to the aperiodic case as mentioned before.

The activation/deactivation for semi-persistent CSI reporting on PUCCH is done by MAC CE using dedicated 16 bits with 5 bits reserved for serving cell ID, 2 bits reserved for bandwidth part (BWP) and a single bit field $S_i$, which indicates the activation/deactivation status of the semi-persistent CSI report configuration within csi-Report-ConfigToAddModList. So refers to the report configuration which includes PUCCH resources for semi-persistent CSI reporting in the indicated bandwidth part (BWP) and has the lowest CSI-ReportConfigId within the list with type set to semiPersistentOnPUCCH.

In one embodiment, the same field $S_i$ can be used to trigger new CSI-ReportConfidId's referring to AI/ML based CSI feedback. In another embodiment, one of the reserved bits R can be replaced by a new single bit field CsiF (CSI format) that indicates whether the CSI reporting format for the CSI-ReportConfigId uses codebook based or AI/ML based CSI feedback.

Figure 14:
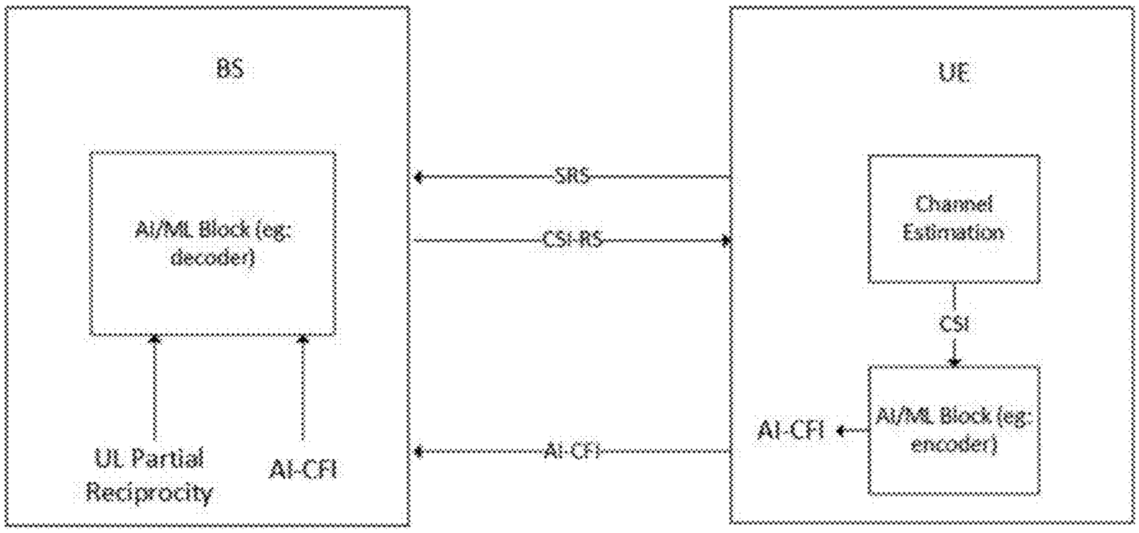
FIG. 14 illustrates an apparatus where the BS uses UL partial reciprocity information for decoding the channel according to embodiments of the present disclosure.

Reconstruction using UL partial reciprocity: When using AI/ML based CSI feedback mechanism, base station reconstructs the channel matrix (CSI) from the extracted feature (AI-CFI) it received from the UE. In this embodiment, additional supporting information like UL partial reciprocity information available at the base station is used to enhance the reconstruction as illustrated in FIG. 14. The UE sends the sounding reference signal (SRS) information to the BS and estimates the channel based on the CSI-RS sent by the BS. At the UE, an AI/ML model is used to extract the feature information of the CSI, i.e., AI-CFI that has sufficient information to reconstruct the channel at BS. After receiving the AI-CFI information, BS can additionally use UL reciprocity information as input to the BS's AI/ML model to help improve the reconstruction of the high-resolution channel.

CSI Report and trigger configuration for future prediction: The BS sends CSI reporting configuration(s) to the UE using RRC messages. The information element CSI-ReportConfig contains various parameters such as the CSI reporting parameters (PMI, RI, CQI), CSI configuration type (periodic, semi-persistent PUCCH, semi-persistent PUSCH, aperiodic), report frequency configuration (frequency granularity, i.e., wideband/subband), codebook configuration (Type-1/Type-2 codebook parameters), enabling group based beam reporting, etc.

To enable the prediction of CSI at future time, we include an additional field CsiPred-timeoffset in IE CSI-ReportConfig as illustrated in FIG. 15. In one embodiment, the timing offset value is set in RRC message with a value of zero indicating the deactivation of the AI/ML model to predict the CSI.

In another embodiment, for aperiodic CSI report configuration, the timing offset value set in RRC message and the activation/deactivation of the CSI prediction is indicated by DCI introducing an additional single bit field CSI Prediction in DCI format 0_1. CSI Prediction value set to 0 implies deactivation of CSI prediction based on AI/ML methods and value 1 implies activation of AI/ML based CSI prediction at a future time step as indicated in the field CsiPred-timeoffset set in RRC message CSI-ReportConfig. In yet another embodiment, for aperiodic CSI report configuration, a hybrid model can be used, where timing offset is the RRC message CSI-ReportConfig can take values from a predetermined set of values, say of length n: $\{t_1, \ldots, t_n\}$ and the DCI indicates the value to be selected for CSI prediction, by introducing a new field CSI Prediction in DCI format 0_1 which takes values between $\{1 \ldots n\}$.

Semi-persistent CSI reporting on PUSCH can follow the same methods as before, and for semi-persistent CSI reporting on PUCCH, a new single bit field CsiP (CSI Prediction) can be introduced in place of a reserved bit that activates/deactivates the AI/ML based CSI prediction at a timeoffset set in CSI-ReportConfig.

In yet another one embodiment, when the CSI prediction is activated in of the CSI reporting configurations (periodic, semi-persistent, aperiodic), the feedback of predicted CSI can be based on traditional methods such as codebook based or can be based on AI/ML model.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method, comprising:

indicating capability of a user equipment (UE) to support one of machine learning (ML)-assisted channel state information (CSI) reporting or ML-assisted CSI prediction;

receiving ML-assisted CSI configurations, wherein the ML-assisted CSI configurations include one or more indications that enable ML-assisted CSI prediction and ML-assisted CSI reporting, wherein when the one or more indications enable ML-assisted CSI prediction, the ML-assisted CSI configurations include a timing offset for future CSI prediction and an indication of an ML model used for the ML-assisted CSI prediction, and when the one or more indications enable ML-assisted CSI reporting, the ML-assisted CSI configurations include a configuration for a CSI report quantity, artificial intelligence channel feature information (AI-CFI), an indication of an ML model for the ML-assisted CSI reporting; and one of performing ML model training or receiving trained ML model parameters;

after receiving the ML-assisted CSI configurations, receiving CSI reference signals corresponding to at least one of the ML-assisted CSI configurations;

in response to ML-assisted CSI prediction being enabled by the one or more indications, determining and transmitting predicted CSI as feedback; and in response to ML-assisted CSI reporting being enabled by the one or more indications, measuring the CSI reference signals based on a configuration for a CSI report quantity, and transmitting a CSI report that includes the AI-CFI.

2. The method of claim 1, wherein the AI-CFI includes at least one of:

a quantized output of an ML model that corresponds to compressed knowledge of a channel, and a quantized output of an ML model that correspond to relevant features of the channel.

3. The method of claim 1, wherein the ML-assisted CSI configurations include information to configure the AI-CFI, and wherein the AI CHI information to configure the AI-CFI is one of:

a quantization method to be used to quantize an output of the ML model, a number of quantization bits to be used, a compression ratio from original CSI to the AI-CFI, or a total number of CSI feedback bits.

4. The method of claim 1, wherein the ML-assisted CSI configurations include additional information used for selecting the ML model, the additional information comprising signal-to-noise (SNR) ratio ranges.

5. The method of claim 1, wherein the ML-assisted CSI configurations configure dynamic switching, based on a trigger, between:

the ML-assisted CSI reporting and CSI reporting without ML assistance, wherein the trigger comprises one of:

for aperiodic and semi-persistent reporting on a physical uplink shared channel (PUSCH), the trigger is one of a CSI format field within a downlink control information (DCI) format 0_1 or a report configuration identifier within a list of aperiodic or semi-persistent trigger events, and for semi-persistent reporting on a physical uplink control channel (PUCCH), the trigger a dedicated field within a medium access control-control element (MAC-CE).

6. The method of claim 1, wherein the timing offset for future CSI prediction is received as one of: a fixed value configured via a radio resource control (RRC) message or a set of values.

7. The method of claim 1, wherein the ML-assisted CSI configurations dynamically switch between reporting a current instant CSI to ML-based future predicted CSI reporting using a trigger selected from:

for aperiodic and semi-persistent reporting on a physical uplink shared channel (PUSCH), the trigger is one of a field within downlink control information (DCI) format 0_1 or a report configuration identifier within one of a list of aperiodic CSI report triggers or an information element for semi-persistent CSI reporting on the PUSCH, or for semi-persistent reporting on a physical uplink control channel (PUCCH), the trigger is a dedicated field within a medium access control-control element (MAC-CE).

8. A user equipment (UE), comprising:

a transceiver configured to:

indicate capability of the UE to support one of machine learning (ML)-assisted channel state information (CSI) reporting or ML-assisted CSI prediction, receive ML-assisted CSI configurations, wherein the ML-assisted CSI configurations include one or more indications that enable at least one of: ML-assisted CSI prediction or ML-assisted CSI reporting, wherein when the one or more indications enable ML-assisted CSI prediction, the ML-assisted CSI configurations include a timing offset for future CSI prediction and an indication of an ML model used for the ML-assisted CSI prediction, and when the one or more indications enable ML-assisted CSI reporting, the ML-assisted CSI configurations include a configuration for a CSI report quantity, artificial intelligence channel feature information (AI-CFI), an indication of an ML model for the ML-assisted CSI reporting, and after receiving the ML-assisted CSI configurations, receive CSI reference signals corresponding to at least one of the ML-assisted CSI configurations; and a processor configured to:

one of perform ML model training or receive trained ML model parameters, in response to ML-assisted CSI prediction being enabled by the one or more indications, determine and transmit predicted CSI as feedback, and in response to ML-assisted CSI reporting being enabled by the one or more indications, measure the CSI reference signals based on a configuration for a CSI report quantity, and transmit a CSI report that includes the AI-CFI.

9. The UE of claim 8, wherein the AI-CFI includes at least one of:

a quantized output of an ML model that corresponds to compressed knowledge of a channel, and a quantized output of an ML model that corresponds to relevant features of the channel.

10. The UE of claim 8, wherein the ML-assisted CSI configurations include information to configure the AI-CFI, and wherein the information to configure the AI-CFI is one of:

a quantization method to be used to quantize an output of the ML model, a number of quantization bits to be used, a compression ratio from original CSI to the AI-CFI, or a total number of CSI feedback bits.

11. The UE of claim 8, wherein the ML-assisted CSI configurations include additional information used for selecting the ML model, the additional information comprising signal-to-noise (SNR) ratio ranges.

12. The UE of claim 8, wherein the ML-assisted CSI configurations configure dynamic switching, based on a trigger, between:

the ML-assisted CSI reporting and CSI reporting without ML assistance, wherein the trigger comprises one of:

for aperiodic and semi-persistent reporting on a physical uplink shared channel (PUSCH), the trigger is one of a CSI format field within a downlink control information (DCI) format 0_1 or a report configuration identifier within a list of aperiodic or semi-persistent trigger events, and for semi-persistent reporting on a physical uplink control channel (PUCCH), the trigger is a dedicated field within a medium access control-control element (MAC-CE).

13. The UE of claim 8, wherein the timing offset for future CSI prediction is received as one of: a fixed value configured via a radio resource control (RRC) message or a set of values.

14. The UE of claim 8, wherein the ML-assisted CSI configurations dynamically switch between reporting a current instant CSI to ML-based future predicted CSI reporting using a trigger selected from:

for aperiodic and semi-persistent reporting on a physical uplink shared channel (PUSCH), the trigger is one of a field within downlink control information (DCI) format 0_1 or a report configuration identifier within one of a list of aperiodic CSI report triggers or an information element for semi-persistent CSI reporting on the PUSCH, or for semi-persistent reporting on a physical uplink control channel (PUCCH), the trigger is a dedicated field within a medium access control-control element (MAC-CE).

15. A base station (BS), comprising:

a processor; and a transceiver configured to obtain an indication of capability of a user equipment (UE) to support one of machine learning (ML)-assisted channel state information (CSI) reporting or ML assisted CSI prediction, transmit ML-assisted CSI, wherein the ML-assisted CSI configurations include one or more indications that enable at least one of: ML-assisted CSI prediction or ML-assisted CSI reporting, wherein when the one or more indications enable ML-assisted CSI prediction, the ML-assisted CSI configurations include a timing offset for future CSI prediction and an indication of an ML model used for the ML-assisted CSI prediction, and when the one or more indications enable ML-assisted CSI reporting, the ML-assisted CSI configurations include a configuration for a CSI report quantity, artificial intelligence channel feature information (AI-CFI), an indication of an ML model for the ML assisted-CSI reporting, and after transmitting the ML-assisted CSI configurations, transmit CSI reference signals corresponding to at least one of the ML-assisted CSI configurations, in response to ML-assisted CSI prediction being enabled by the one or more indications, receive predicted CSI determined by the UE as feedback, in response to ML-assisted CSI reporting being enabled by the one or more indications, receive a CSI report that includes the AI-CFI and corresponding to measurement of the CSI reference signals based on a configuration for a CSI report quantity.

16. The BS of claim 15, wherein the AI-CFI includes at least one of:

a quantized output of an ML model that corresponds to compressed knowledge of a channel, and a quantized output of an ML model that corresponds to relevant features of the channel.

17. The BS of claim 15, wherein the ML-assisted CSI configurations include information to configure the AI-CFI, and wherein the information to configure the AI-CFI is one of:

a quantization method to be used to quantize an output of the ML model, a number of quantization bits to be used, a compression ratio from original CSI to the AI-CFI, or a total number of CSI feedback bits.

18. The BS of claim 15, wherein the ML-assisted CSI configurations include additional information used for selecting the ML model, the additional information comprising signal-to-noise (SNR) ratio ranges.

19. The BS of claim 15, wherein the ML-assisted CSI configurations configure dynamic switching, based on a trigger, between:

the ML-assisted CSI reporting and CSI reporting without ML assistance, wherein the trigger comprises one of:

for aperiodic and semi-persistent reporting on a physical uplink shared channel (PUSCH), the trigger is one of a CSI format field within a downlink control information (DCI) format 0_1 or a report configuration identifier within a list of aperiodic or semi-persistent trigger events, and for semi-persistent reporting on a physical uplink control channel (PUCCH), the trigger is a dedicated field within a medium access control-control element (MAC-CE).

20. The BS of claim 15, wherein the timing offset for future CSI prediction is transmitted as one of: a fixed value configured via a radio resource control (RRC) message or a set of values.

* * * * *